(12) United States Patent
Huizen et al.

(10) Patent No.: US 11,679,711 B2
(45) Date of Patent: *Jun. 20, 2023

(54) VEHICULAR EXTERIOR LIGHTING SYSTEM WITH GROUND ILLUMINATION

(71) Applicant: Magna Mirrors of America, Inc., Holland, MI (US)

(72) Inventors: Gregory A. Huizen, Hudsonville, MI (US); Mitchell J. Wesley, Grand Rapids, MI (US); David A. Dingman, Grand Haven, MI (US); Justin E. Sobecki, Rockford, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/304,027

(22) Filed: Jun. 14, 2021

(65) Prior Publication Data

US 2021/0300237 A1     Sep. 30, 2021

Related U.S. Application Data

(63) Continuation of application No. 16/947,772, filed on Aug. 17, 2020, now Pat. No. 11,034,290, which is a
(Continued)

(51) Int. Cl.
*B60Q 1/26* (2006.01)
*E05B 85/16* (2014.01)
(Continued)

(52) U.S. Cl.
CPC ......... *B60Q 1/2669* (2013.01); *B60Q 1/2696* (2013.01); *E05B 17/10* (2013.01); *E05B 85/16* (2013.01); *F21S 43/14* (2018.01); *F21S 43/15* (2018.01); *F21S 43/26* (2018.01); *B60Q 2400/20* (2013.01); *B60Q 2400/40* (2013.01); *B60R 2300/102* (2013.01);
(Continued)

(58) Field of Classification Search
CPC ............... B60Q 1/2669; B60Q 1/2696; B60Q 2400/20; B60Q 2400/40; F21S 43/14; F21S 43/15; F21S 43/26; E05B 17/10; F21Y 2115/10
USPC ................................................ 362/501, 499
See application file for complete search history.

(56) References Cited

U.S. PATENT DOCUMENTS 3,667,315 A    6/1972   Polly, Sr.
3,695,210 A   10/1972   Stein
(Continued)

*Primary Examiner* — Lau K Tso
(74) *Attorney, Agent, or Firm* — Honigman LLP

(57) ABSTRACT

A vehicular exterior lighting system includes a lighting module disposed at a side of a vehicle. The lighting module includes at least one light emitting diode. The lighting module is operable to emit light that is viewable by a person exterior the side of the vehicle who is viewing the side of the vehicle. The lighting module emits white light responsive to a signal from a remote device to provide ground illumination of a ground region at the side of the vehicle at which the lighting module is disposed, and the lighting module (i) emits a first color of light responsive to a door lock signal and (ii) emits a second color of light responsive to a door unlock signal. The first color of light is different than the second color of light.

27 Claims, 17 Drawing Sheets

Related U.S. Application Data continuation of application No. 16/798,776, filed on Feb. 24, 2020, now Pat. No. 10,744,931, which is a continuation of application No. 16/155,032, filed on Oct. 9, 2018, now Pat. No. 10,569,697.

(60) Provisional application No. 62/570,211, filed on Oct. 10, 2017.

(51) Int. Cl.
*F21S 43/14* (2018.01)
*F21S 43/20* (2018.01)
*F21S 43/15* (2018.01)
*E05B 17/10* (2006.01)
*F21Y 115/10* (2016.01)

(52) U.S. Cl.
CPC ... *B60R 2300/103* (2013.01); *B60R 2300/105* (2013.01); *F21Y 2115/10* (2016.08)

(56) References Cited

U.S. PATENT DOCUMENTS

| | | |
|---|---|---|
| 3,737,944 A | 6/1973 | Szabo et al. |
| 3,813,729 A | 6/1974 | Szabo et al. |
| 3,908,149 A | 9/1975 | Gergoe et al. |
| 4,041,301 A | 8/1977 | Pelchat |
| 4,349,722 A | 9/1982 | Kurth et al. |
| 4,471,209 A | 9/1984 | Hollander |
| 4,580,822 A | 4/1986 | Fukumoto |
| 4,686,741 A | 8/1987 | Moore et al. |
| 4,837,892 A | 6/1989 | Lo |
| 4,892,342 A | 1/1990 | Newman et al. |
| 4,914,779 A | 4/1990 | Nakai et al. |
| 5,129,694 A | 7/1992 | Tanimoto et al. |
| 5,297,010 A | 3/1994 | Camarota et al. |
| 5,298,306 A | 3/1994 | Miller |
| 5,371,659 A | 12/1994 | Pastrick et al. |
| 5,390,572 A | 2/1995 | Gakhar et al. |
| 5,398,369 A | 3/1995 | Heinzelman et al. |
| 5,497,305 A | 3/1996 | Pastrick et al. |
| 5,530,989 A | 7/1996 | Remmert et al. |
| 5,651,163 A | 7/1997 | Tamaki |
| 5,669,699 A | 9/1997 | Pastrick et al. |
| 5,671,996 A | 9/1997 | Bos et al. |
| 5,709,453 A | 1/1998 | Krent et al. |
| 5,740,586 A | 4/1998 | Gomas |
| 5,769,209 A | 6/1998 | Massey, III |
| 5,781,958 A | 7/1998 | Meessmann et al. |
| 5,823,654 A | 10/1998 | Pastrick et al. |
| 5,857,241 A | 1/1999 | Camp, Jr. et al. |
| 5,938,321 A | 8/1999 | Bos et al. |
| 5,956,799 A | 9/1999 | Panaccione et al. |
| 6,018,841 A | 2/2000 | Kelsay et al. |
| 6,036,244 A | 3/2000 | Tyves et al. |
| 6,070,998 A | 6/2000 | Jennings et al. |
| 6,086,229 A | 7/2000 | Pastrick |
| 6,135,621 A | 10/2000 | Bach et al. |
| 6,139,172 A | 10/2000 | Bos et al. |
| 6,149,287 A | 11/2000 | Pastrick et al. |
| 6,152,590 A | 11/2000 | Furst et al. |
| 6,164,805 A | 12/2000 | Hulse |
| 6,176,602 B1 | 1/2001 | Pastrick et al. |
| 6,180,212 B1 | 1/2001 | Single et al. |
| 6,209,933 B1 | 4/2001 | Ang et al. |
| 6,276,821 B1 | 8/2001 | Pastrick et al. |
| 6,280,069 B1 | 8/2001 | Pastrick et al. |
| 6,291,905 B1 | 9/2001 | Drummond et al. |
| 6,349,450 B1 | 2/2002 | Koops et al. |
| 6,396,408 B2 | 5/2002 | Drummond et al. |
| 6,416,208 B2 | 7/2002 | Pastrick et al. |
| 6,464,805 B2 | 10/2002 | Matsuda et al. |
| 6,477,464 B2 | 11/2002 | McCarthy et al. |
| 6,568,839 B1 | 5/2003 | Pastrick et al. |
| 6,572,250 B1 | 6/2003 | Assinder et al. |
| 6,907,643 B2 | 6/2005 | Koops et al. |
| 6,977,619 B2 | 12/2005 | March et al. |
| 7,407,203 B2 | 8/2008 | Huizenga et al. |
| 8,333,492 B2 | 12/2012 | Dingman et al. |
| 8,764,256 B2 | 7/2014 | Foote et al. |
| 8,786,401 B2 | 7/2014 | Sobecki et al. |
| 8,801,245 B2 | 8/2014 | De Wind et al. |
| 8,917,437 B2 | 12/2014 | Baur et al. |
| 8,928,753 B2 | 1/2015 | Han et al. |
| 9,484,626 B2 | 11/2016 | Dykhouse |
| 9,610,891 B2 | 4/2017 | Yamada |
| 9,758,088 B1 | 9/2017 | Salter et al. |
| 9,849,829 B1 | 12/2017 | Salter et al. |
| 10,569,697 B2 | 2/2020 | Huizen et al. |
| 10,744,931 B2 | 8/2020 | Huizen et al. |
| 11,034,290 B2 | 6/2021 | Huizen et al. |
| 2003/0095416 A1 | 5/2003 | Huizenga |
| 2004/0022065 A1 | 2/2004 | Assinder et al. |
| 2007/0053195 A1 | 3/2007 | Mberti |
| 2007/0195542 A1 | 8/2007 | Metros et al. |
| 2007/0206388 A1 | 9/2007 | Misawa et al. |
| 2007/0230201 A1 | 10/2007 | Oba et al. |
| 2007/0258258 A1 | 11/2007 | Wang |
| 2010/0007463 A1 | 1/2010 | Dingman et al. |
| 2010/0088855 A1 | 4/2010 | Ruse et al. |
| 2010/0321945 A1 | 12/2010 | Lang et al. |
| 2010/0321946 A1 | 12/2010 | Dingman et al. |
| 2012/0106182 A1 | 5/2012 | Minter et al. |
| 2012/0127746 A1 | 5/2012 | Lee |
| 2013/0242586 A1 | 9/2013 | Huizen et al. |
| 2015/0224919 A1 | 8/2015 | Sobecki et al. |
| 2015/0329048 A1 | 11/2015 | Wang et al. |
| 2019/0376324 A1* | 12/2019 | Walawender ............ E05B 17/10 |

* cited by examiner

VEHICULAR EXTERIOR LIGHTING SYSTEM WITH GROUND ILLUMINATION

CROSS REFERENCE TO RELATED APPLICATIONS

The present application is a continuation of U.S. patent application Ser. No. 16/947,772, filed Aug. 17, 2020, now U.S. Pat. No. 11,034,290, which is a continuation of U.S. patent application Ser. No. 16/798,776, filed Feb. 24, 2020, now U.S. Pat. No. 10,744,931, which is a continuation of U.S. patent application Ser. No. 16/155,032, filed Oct. 9, 2018, now U.S. Pat. No. 10,569,697, which claims the filing benefits of U.S. provisional application Ser. No. 62/570,211, filed Oct. 10, 2017, which is hereby incorporated herein by reference in its entirety.

FIELD OF THE INVENTION

The present invention relates to light modules for vehicles and, more particularly, to a light module for an exterior door handle for opening a side door of a vehicle and/or to a light module that provides ground illumination at the side of the vehicle.

BACKGROUND OF THE INVENTION

A door handle for a vehicle door typically includes a handle portion that is pivotable relative to a base portion, whereby pivotal movement of the handle portion pulls at a cable or rod to electrically trigger or move a latch mechanism to release the latch and open the door.

SUMMARY OF THE INVENTION

The present invention provides a door handle assembly configured to mount at a handle region of a vehicle door. The door handle assembly comprises a handle portion pivotally mounted at the handle region of the vehicle door and a pocket lighting module. The handle portion is disposed at a pocket region of the handle region. The pocket lighting module comprises at least one light emitting diode operable to emit light to illuminate the pocket region. The pocket lighting module is operable to emit different colors of light responsive to different triggers. For example, the pocket lighting module may (i) emit red light responsive to a door lock input, (ii) emit green light responsive to a door unlock input, and (iii) emit white light responsive to detection of a remote device of the vehicle approaching the vehicle. The pocket lighting module may intermittently emit colored light in different patterns responsive to respective triggers.

The present invention also provides a ground illumination light module that includes at least one light emitting diode and a freeform optic disposed in front of said at least one light emitting diode. The ground illumination light module, when the light emitting diode is electrically powered, illuminates a ground region at the side of the vehicle that spans the entire length of the vehicle and that includes a region forward of the vehicle and rearward of the vehicle so as to illuminate regions encompassed by a sideward viewing camera, a forward viewing camera and a rearward viewing camera of a surround view multi-camera system of the vehicle. The ground region may be illuminated with a luminance of at least 10 lux.

These and other objects, advantages, purposes and features of the present invention will become apparent upon review of the following specification in conjunction with the drawings.

DESCRIPTION OF THE PREFERRED EMBODIMENTS

Figure 1:
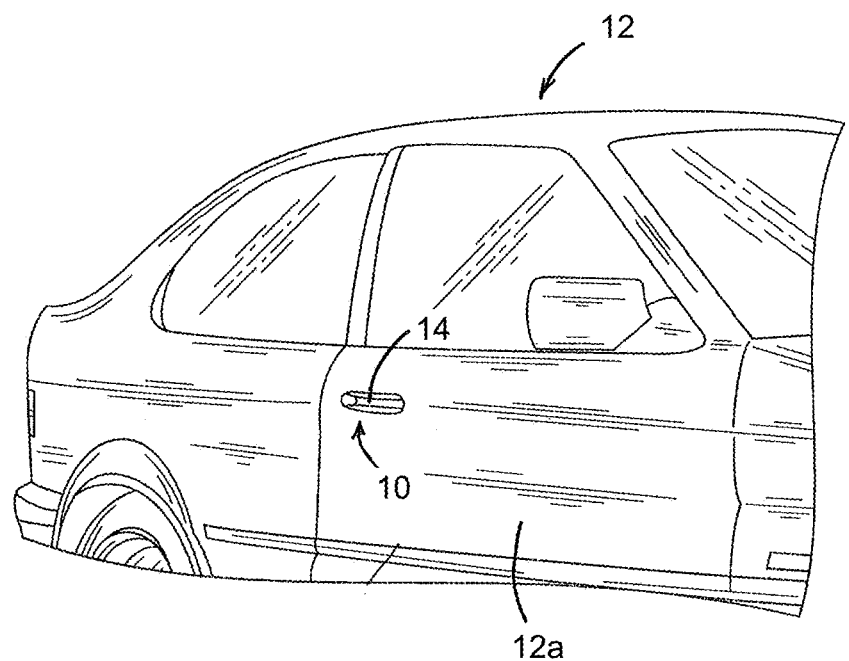
FIG. 1 is a perspective view of a vehicle with a door handle assembly of the present invention.

Referring now to the drawings and the illustrative embodiments depicted therein, a vehicle door handle assembly 10 is mountable to a door 12a of a vehicle 12 and operable to release a latch mechanism (not shown) of the door 12a to open the vehicle door (FIG. 1). Vehicle door handle assembly 10 includes a handle portion 14 that is disposed at the door and that is fixedly mounted at the door or to a bracket mounted to the door.

The door handle assembly includes a lighting module that is operable to illuminate the pocket or recess at the door behind the handle portion 14. When actuated, the lighting module (that comprises one or more light emitting diodes) provides illumination at the pocket region.

Figure 2:
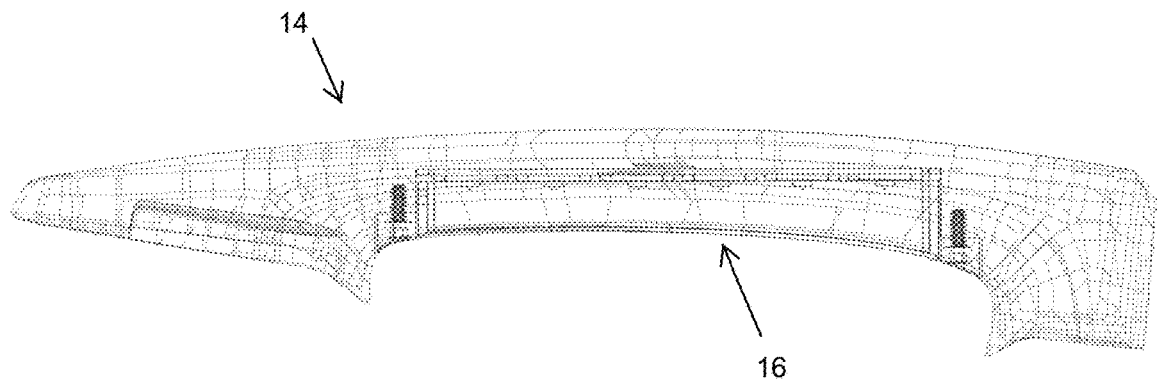
FIG. 2 is a plan view of the door handle, with a pocket lighting module disposed at an inner portion of the strap handle.
Figure 3:
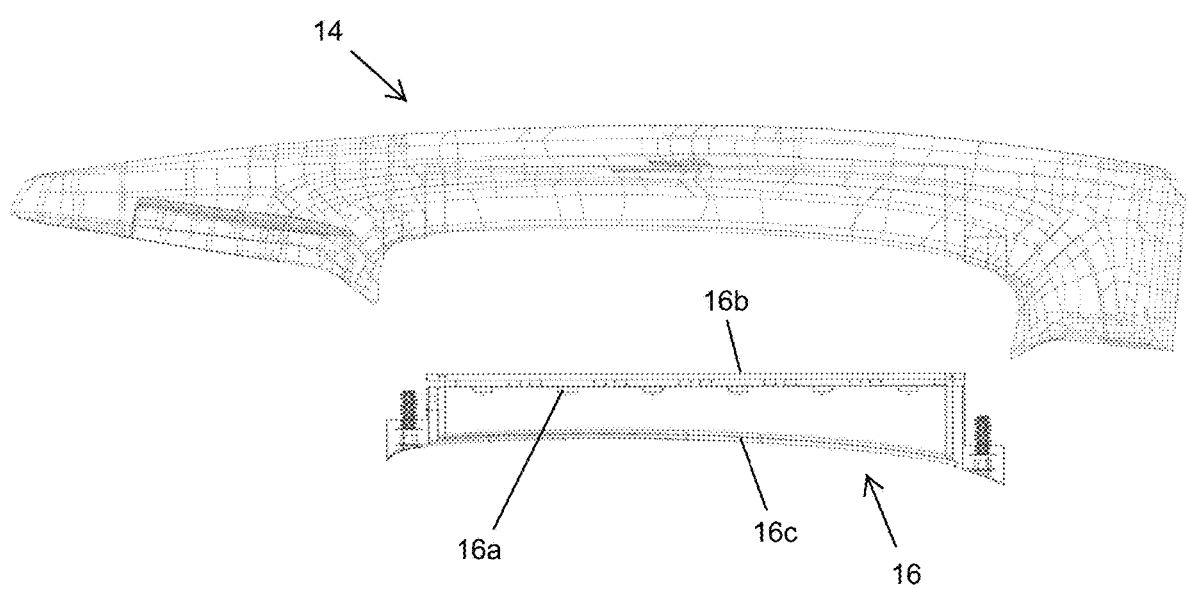
FIG. 3 is an exploded view of the door handle of FIG. 2.

The module may be disposed at the inside portion of the handle. For example, and such as shown in FIGS. 2 and 3, the lighting module 16 is disposed along the inside portion of the handle portion 14. In the illustrated embodiment, the lighting module 16 includes a plurality of light emitting diodes 16a disposed at a circuit element 16b, with a translucent or transparent cover element 16c that forms part of the inside surface of the handle portion. When activated, light emitted by the LEDs passes through the cover element to illuminate the pocket region. The cover element 16c may also include a diffusion material behind it in order to disperse the light so that the user does not see light hot spots. The diffusion material may be uniform or may have different patterns of diffusion, such as, for example, a hex pattern, to display the light at the door handle in different patterns. A housing 16d encases the LEDs and functions to direct emitted light outward through the cover element 16. The LEDs are located in the door handle strap and arranged so as to face approximately perpendicular to the door sheet metal or pocket. Optionally, instead of a plurality of LEDs, the pocket light may comprise a single LED or light source, with a light pipe that transmits light across the inside portion of the door handle.

Figure 4:
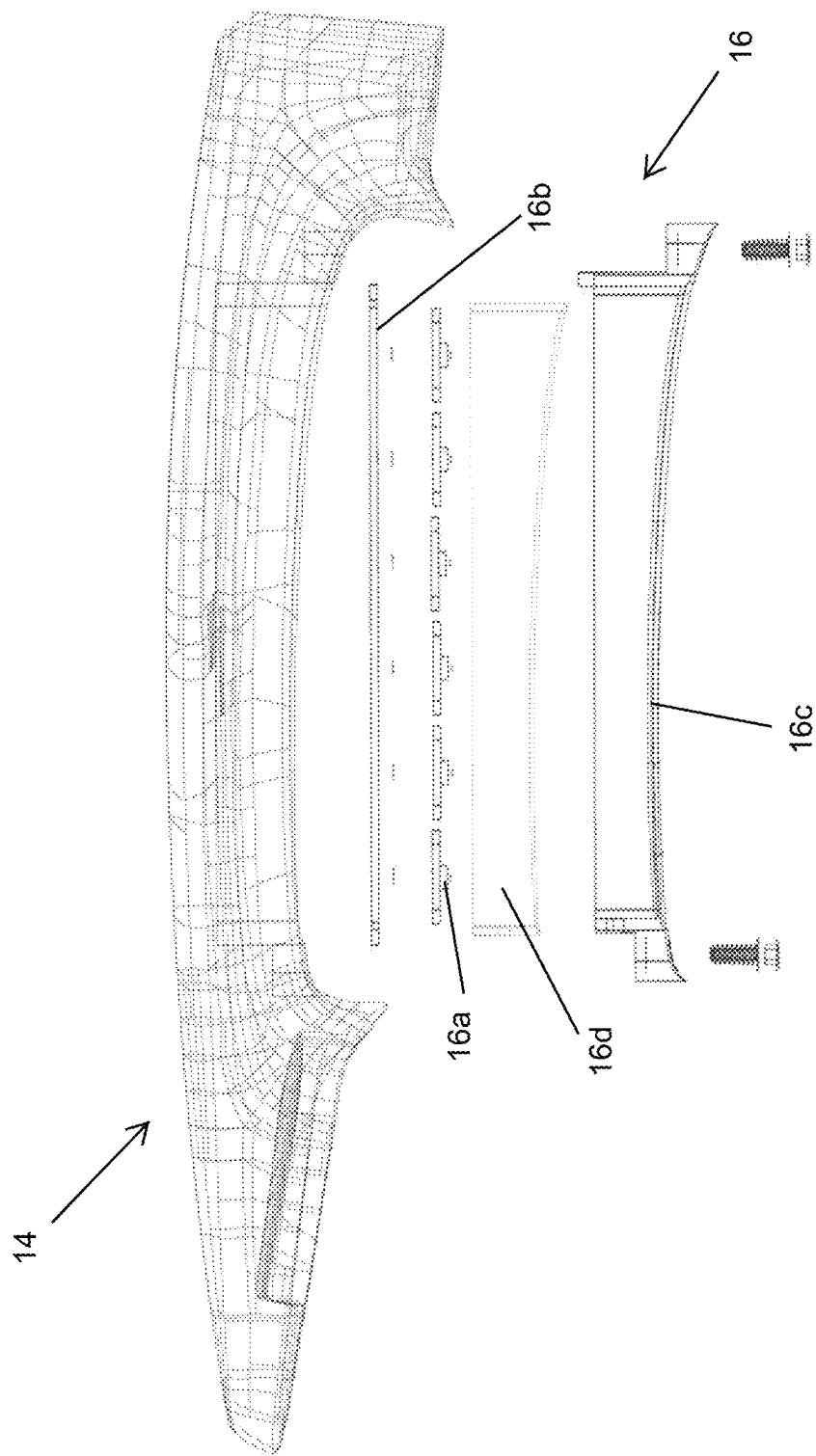
FIG. 4 is a further exploded view of the door handle of FIG. 2.
Figure 5:
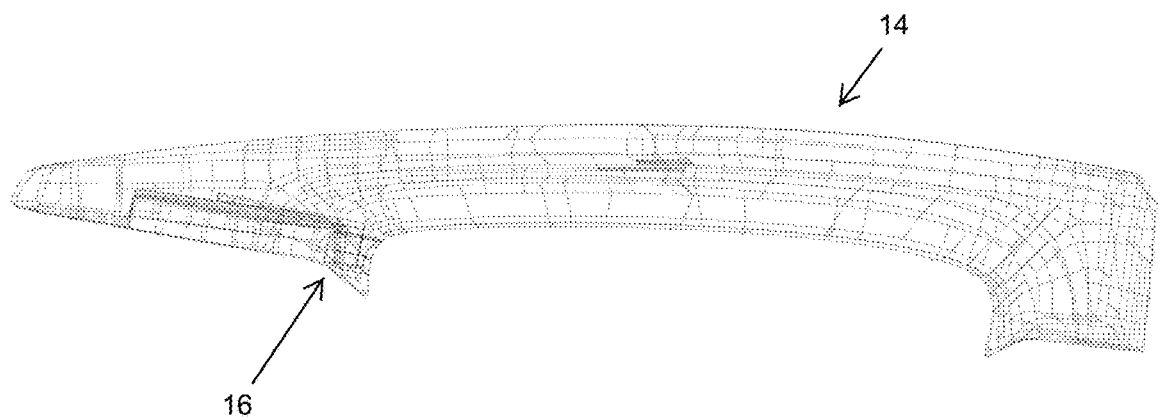
FIG. 5 is a plan view of the door handle, with a pocket lighting module disposed at an end portion of the strap handle.
Figure 6:
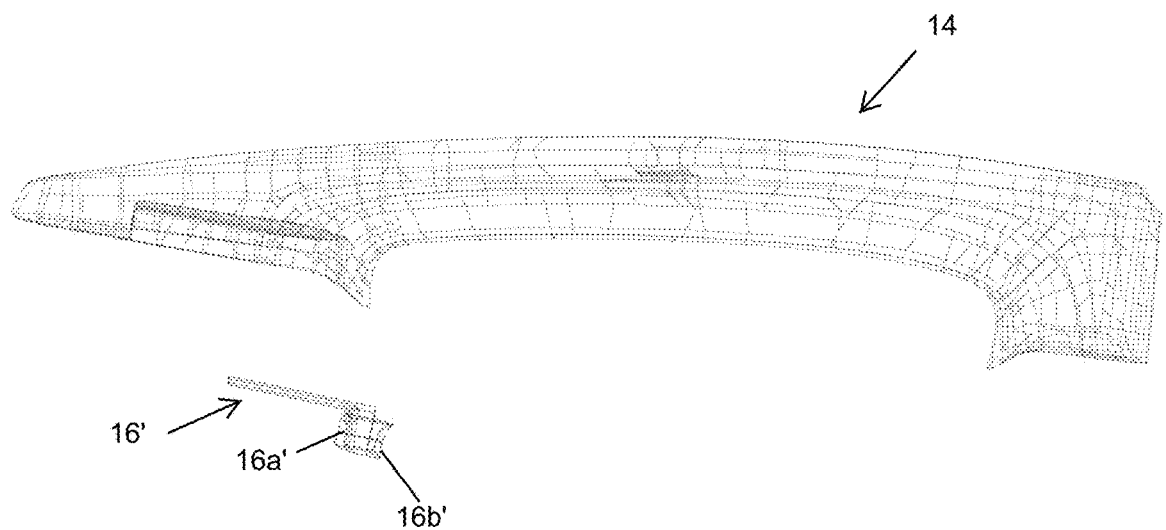
FIG. 6 is an exploded view of the door handle of FIG. 5.

Optionally, and such as shown in FIGS. 4 and 5, the lighting module 16' may be disposed at an end region of the handle portion 14'. In the illustrated embodiment, the lighting module 16' comprises at least one LED 16a' that is disposed at a circuit element 16b' and at or behind a translucent or transparent cover element 16c'. When activated, light emitted by the LED or LEDs passes through the cover element and along the handle portion and pocket region to illuminate the pocket region. The LED or LEDs may be disposed at either the forward end or rearward end (or one or more LEDs at each end) of the door handle strap and aimed or oriented so as to direct or emit light toward the pocket region.

Optionally, the lighting module may be disposed at the door handle bracket and at the pocket region. The light emitted by the LED or LEDs (when energized) provides illumination at the pocket region and may reflect off of the inside surface of the handle portion or strap and toward the ground to provide ground illumination. Optionally, the inside surface of the handle portion may comprise a reflective surface, such as a metallic or chrome plated surface, and/or may be shaped to direct light downward, to enhance reflection of light toward the ground region at the side of the vehicle. The light emitted by the LED or LEDs may provide more direct viewing of the light and may provide enhanced viewability in all ambient lighting conditions and with all vehicle and door handle paint colors.

Optionally, a pocket illumination lighting module may be disposed at the exterior rearview mirror and may be directed toward the door handle. Optionally, a lighting module may be disposed inside the handle portion or strap handle and may illuminate the handle itself (which may comprise a colored but translucent material so it appears painted when the lighting module is not activated, but glows or emits light when the lighting module is activated). Optionally, a lighting module may be disposed at a key lock cylinder of the door handle assembly.

Figure 7:
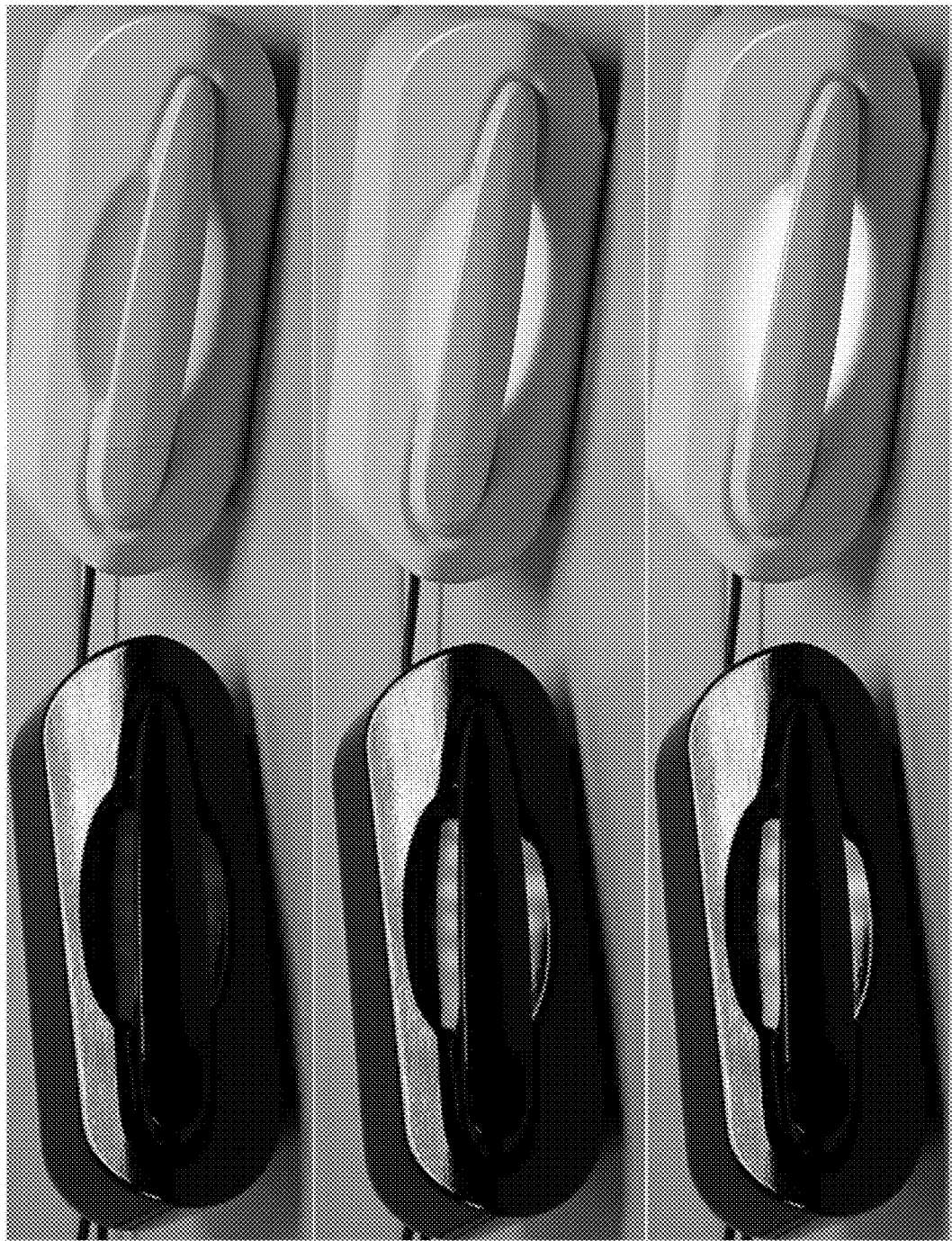
FIG. 7 shows different door handle assemblies with pocket lighting modules at the strap portion and operable to emit different colors of light toward the pocket (the right side of FIG. 7) and with pocket lighting modules at the pocket or bracket and operable to emit different colors of light (the left side of FIG. 7)

The door handle lighting module of the present invention provides illumination at the door handle and pocket region (see, for example, FIG. 7). The lighting module may be operable to emit different colors of light, such as responsive to different inputs or situations. For example, the lighting module may emit red light to indicate that the doors are locked or a panic or hazard input has been received, or the lighting module may emit green light to indicate that the doors are unlocked and the user can enter the vehicle. Optionally, the lighting module may emit yellow light to indicate, for example, a panic or hazard input, or a turn signal indicator or running light or marker light. Optionally, the lighting module may emit white light to provide a security light or welcome light and/or to provide ground illumination. Optionally, the lighting module may emit two or more colors at once. For example, when a door unlock input is received (such as via a passive entry system or remote transmitter or key fob), the lighting module may emit green light from one or more of the LEDs to illuminate the handle or pocket region, and may also emit white light from one or more other LEDs to provide ground illumination at the side of the vehicle.

The lighting module may emit the selected or desired light color or pattern as a steady illumination, and/or may intermittently emit light or blink or flash at various rates depending on the particular event or input or trigger. For example, the lighting module may flash or emit a red light once to indicate the doors have been locked and may flash a red light intermittently to indicate a panic or hazard input or detection of a break in or the like. Optionally, the lighting module may provide fading and dimming of the light to ramp up the lighting intensity at activation and ramp down or fade the lighting intensity at deactivation of the lighting module.

Optionally, the lighting module and door handle assembly may provide various illumination patterns or logos or the like. Optionally, the lighting module and door handle assembly may provide personalized or customized lighting.

Optionally, the lighting module may emit or transmit data over the light waves (such as via R, G and B and/or IR modulated LEDs). For example, the lighting module may emit advertising data or information or payment data or information (such as for drive through tolls or facilities or parking garages) or diagnostic information (such as at a service station or facility).

Optionally, the lighting module may communicate with a V2V (vehicle-to-vehicle) or V2X (vehicle-to-infrastructure) communication system, and may provide light communication/transmission to a receiver of another vehicle or infrastructure. The information may include speed or acceleration information or the like. The lighting module thus may provide a fast form of communication between vehicles. Optionally, the lighting module may be disposed at the exterior mirror to provide enhanced viewing/communication between multiple vehicles in traffic. The lighting module or communication system may provide mesh networking to transmit and receive information. The communication may be communicated from vehicle to vehicle until it is connected. The communication may include location information (such as determined via the vehicle's GPS system) of the communicating or transmitting vehicle. The communication system may provide social networking of vehicles on commute. For example, the communication system may provide for rating of drivers of vehicles on the road. Optionally, the communications and/or ratings may be provided to parents of a driver or other drivers or insurance companies. The communication may provide various indications to other drivers, such as communication that the high-beams of the vehicle are on or to indicate a tailgating warning or the like.

Optionally, the lighting module may provide an alert or pedestrian warning, such as a visual communication to pedestrians at or near the vehicle (which may be suitable for autonomous vehicle applications). For example, the light emitted by the lighting module may be in a pattern that the pedestrian(s) may recognize as being indicative of a driver "waving someone on" or the like. For example, the emitted light pattern may comprise a sequential wave to tell the pedestrian(s) which way to go or that it is safe for them to walk in front of the vehicle. The emitted light pattern may comprise images/signs/emblems or the like. The warning or alert could be provided to alert passing bikers when a door of the vehicle is about to be opened.

Optionally, the lighting module may provide a three dimensional (3D) projection from the door handle or exterior mirror. For example, the light may be emitted through a gas emitted or through the air at the side of the vehicle. Optionally, the module may include a laser to burn/create plasma in the air/gas to provide the desired 3D projection.

The door handle assembly may comprise any suitable type of door handle assembly, and may include or incorporate aspects of the door handle assemblies and lighting devices described in U.S. Pat. Nos. 6,349,450; 6,550,103; 6,907,643; 7,407,203; 8,333,492; 8,786,401 and/or 8,801,245, and/or U.S. Publication Nos. US-2010-0088855 and/or US-2010-0007463, which are hereby incorporated herein by reference in their entireties. Although shown as a strap type handle, the handle assembly may comprise any suitable type of vehicle door handle assembly, such as a paddle type vehicle door handle assembly (having a paddle or the like that may be pulled at to open the vehicle door) or other type of vehicle door handle assembly, while remaining within the spirit and scope of the present invention. Optionally, the door handle assembly may comprise a flush door handle assembly (such as of the types described in U.S. Pat. No. 8,786,401, which is hereby incorporated herein by reference in its entirety), whereby the lighting module may actuate to illuminate the handle portion and may emit light through the handle portion or around the handle portion. Optionally, the door handle assembly of the present invention may include a soft touch handle portion, such as utilizing the principles described in U.S. Pat. Nos. 6,349,450; 6,550,103 and/or 6,907,643, which are hereby incorporated herein by reference in their entireties The door handle assembly is thus operable to open the vehicle door when a user grasps the door handle portion at the side of the vehicle door. The door handle assembly may also be operable in conjunction with a passive keyless entry or other sensing system that is operable to determine whether or not the person at the vehicle door is authorized for entry into the vehicle, and may only open the vehicle door when that system recognizes the user or key fob or transmitting device associated with the owner or authorized user of the vehicle. Optionally, the door handle assembly may be associated with or in communication with a door zone module, such as by utilizing aspects of the vehicle door systems described in U.S. Publication No. US-2010-0007463, which is hereby incorporated herein by reference in its entirety.

Optionally, the door handle assembly may include or may be associated with an antenna for receiving signals from or communicating with a remote device. For example, the antenna (such as, for example, an antenna of the types described in U.S. Pat. Nos. 9,484,626 and/or 6,977,619, which are hereby incorporated herein by reference in their entireties) may communicate a signal to the door locking system via a wire connection or the like, or wirelessly, such as via a radio frequency signal or via an infrared signal or via other wireless signaling means. Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 8,764,256; 6,280,069; 6,276,821; 6,176,602; 6,152,590; 6,149,287; 6,139,172; 6,086,229; 5,938,321; 5,671,996; 5,497,305; 6,416,208 and/or 6,568,839, and/or U.S. Publication No. US-2013-0242586, all of which are hereby incorporated herein by reference in their entireties), or the vehicle ignition, or any other desired system, while remaining within the spirit and scope of the present invention. The door handle and/or illumination module may be in communication with other systems and/or controls of the vehicle door and/or vehicle, such as by utilizing aspects of the door systems described in U.S. Publication No. US-2010-0007463, which is hereby incorporated herein by reference in its entirety.

Optionally, the lighting module may comprise a strip light or pocket light or the like, and the door handle assembly may include a ground illumination light and/or other light or lighting element, such as a projection light or the like, such as by utilizing aspects of the door handle assemblies and lighting systems described in U.S. Pat. Nos. 5,371,659; 5,497,305; 5,669,699; 5,823,654; 6,349,450; 6,550,103; 8,786,401 and/or 8,801,245, and/or U.S. Publication Nos. US-2010-0088855 and/or US-2010-0007463, which are hereby incorporated herein by reference in their entireties.

Figure 8:
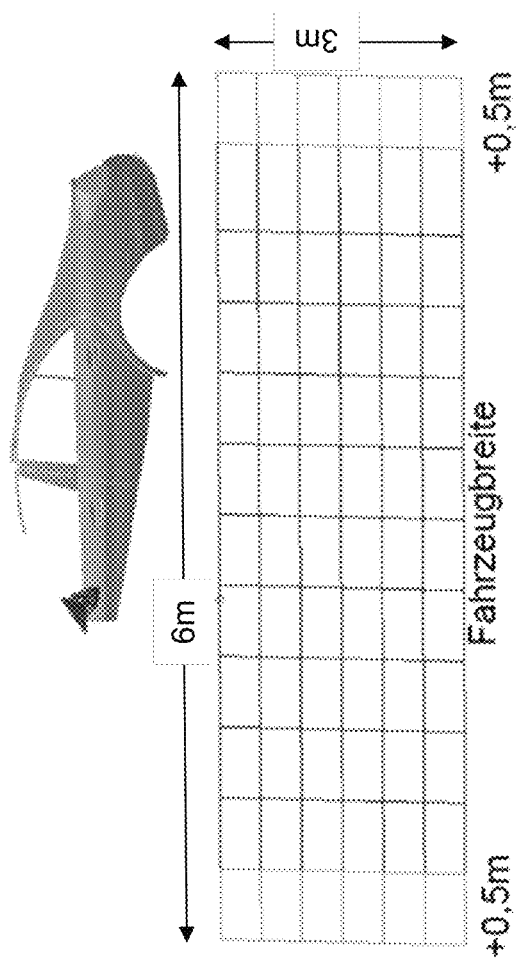
FIG. 8 is a schematic showing a region at the side of a vehicle that is to be illuminated by a ground illumination light module of the present invention.
Figure 9:
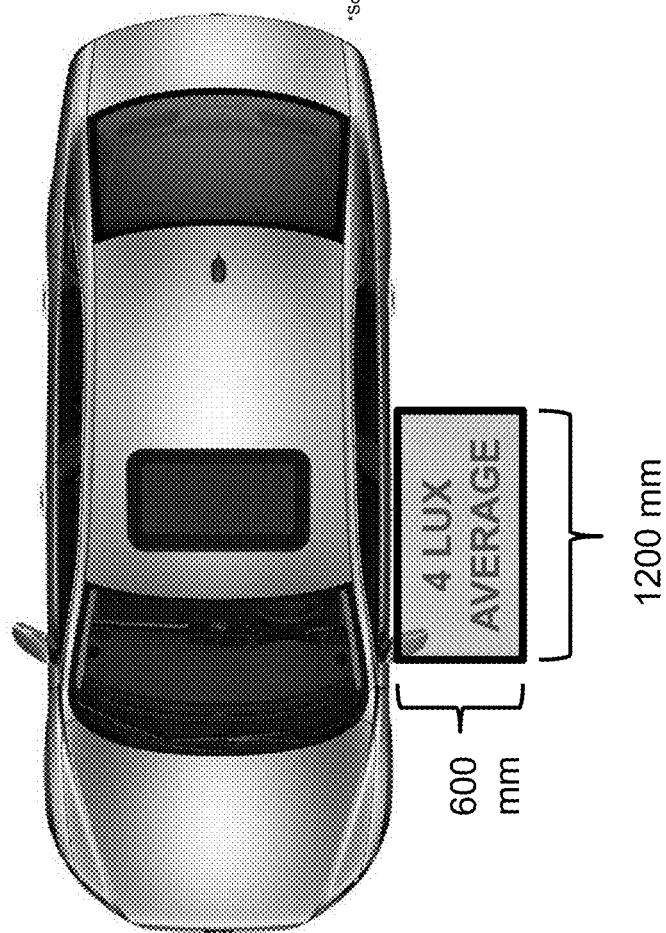
FIG. 9 is a plan view of a vehicle with a standard ground illumination light module.
Figure 10:
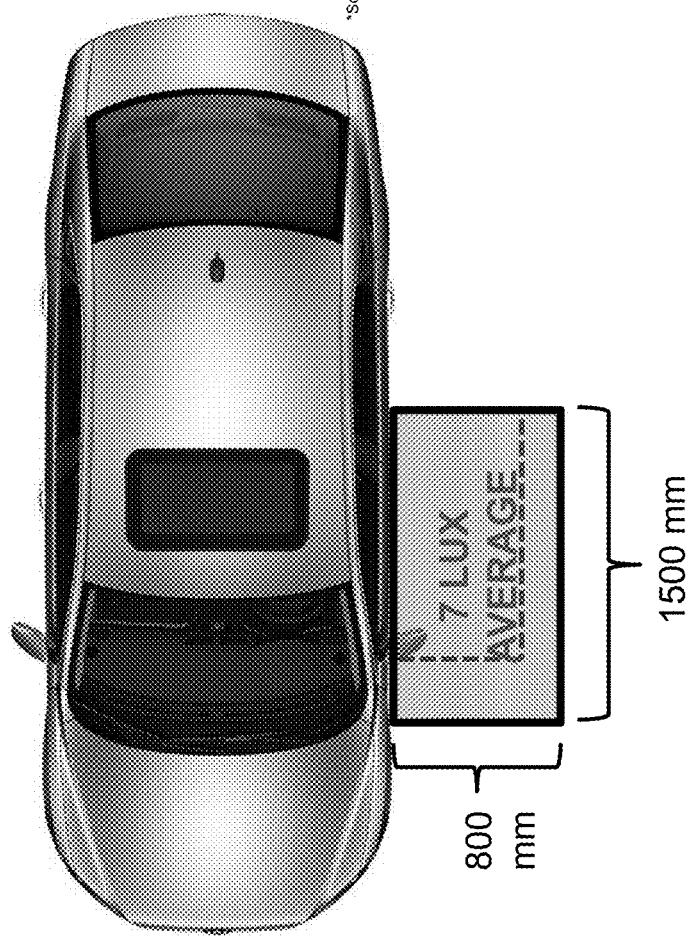
FIG. 10 is a plan view of a vehicle with a twin ground illumination light module.

Optionally, the lighting module may be disposed at an exterior rearview mirror (or door handle) of the vehicle and may provide enhanced ground illumination at the ground at the respective side of the vehicle. For example, the lighting module may provide substantially uniform or homogeneous illumination at the side of the vehicle, such as for surround view or 360 degree camera applications. The lighting module may provide enhanced and uniform illumination for machine vision based maneuvering cameras, such as for self-parking vehicles and/or self-driving or autonomous or semi-autonomous vehicles. As shown in FIG. 8, the lighting module may provide a wide range of illumination such that, at any point in the light carpet, especially at each grid point, the illumination has a minimum luminance of 10 lux within the sub grid, preferably with the difference in brightness between two adjacent raster points being not more than 5 percent.

Figure 11:
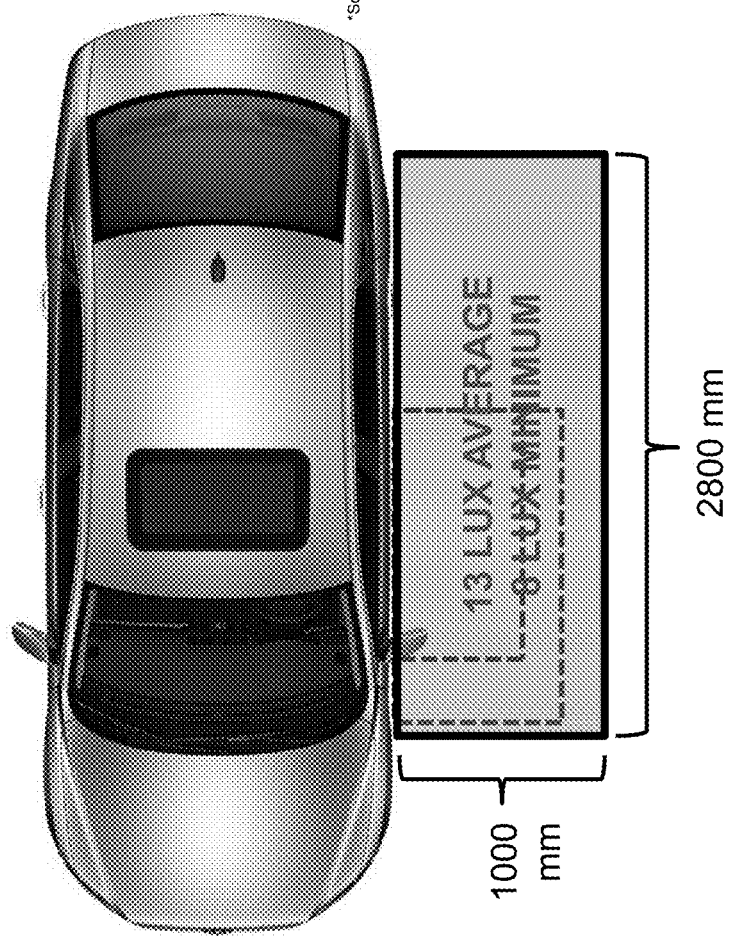
FIG. 11 is a plan view of a vehicle with a power ground illumination light module.
Figure 11A:
FIG. 11A is a perspective view showing the illuminated region at the ground by the vehicle with the power ground illumination light module.
Figure 12:
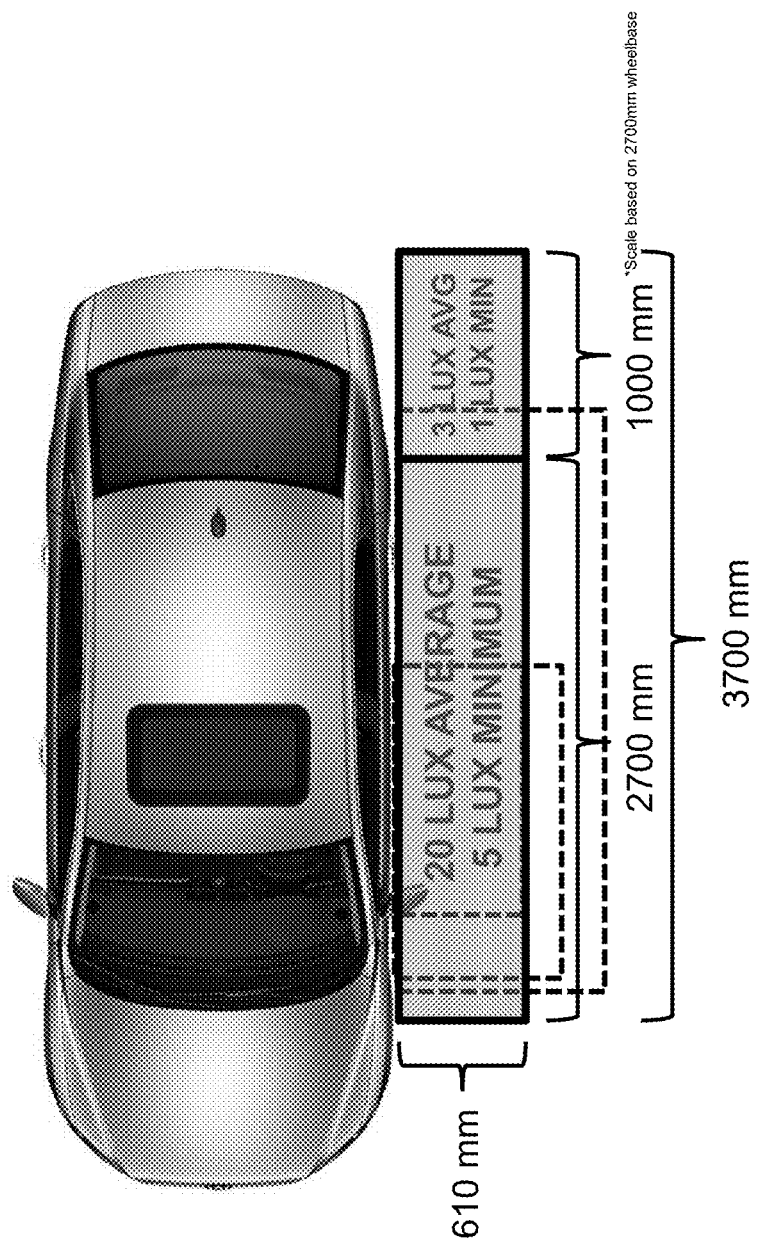
FIG. 12 is a plan view of a vehicle with a super ground illumination light module.
Figure 12A:
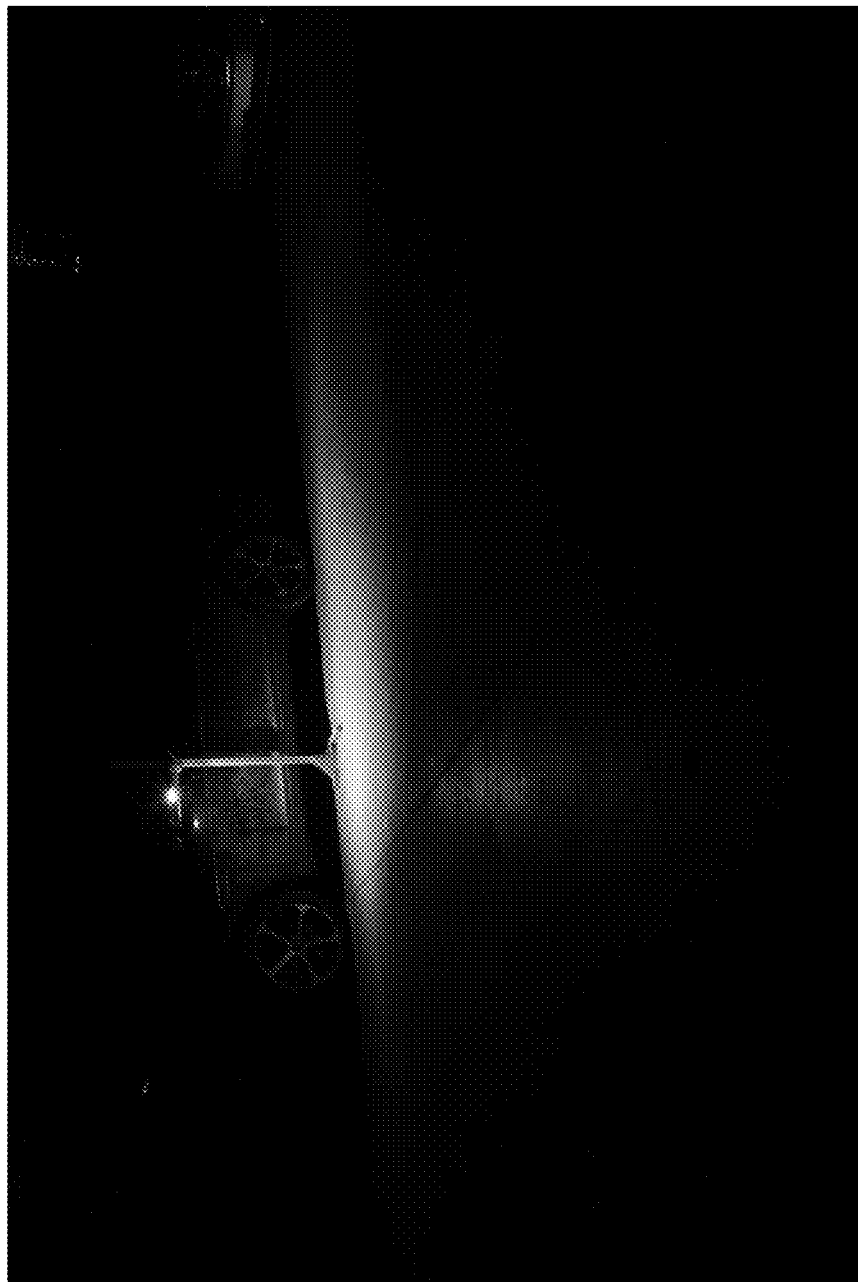
FIG. 12A is a perspective view showing the illuminated region at the ground by the vehicle with the super ground illumination light module.
Figure 13:
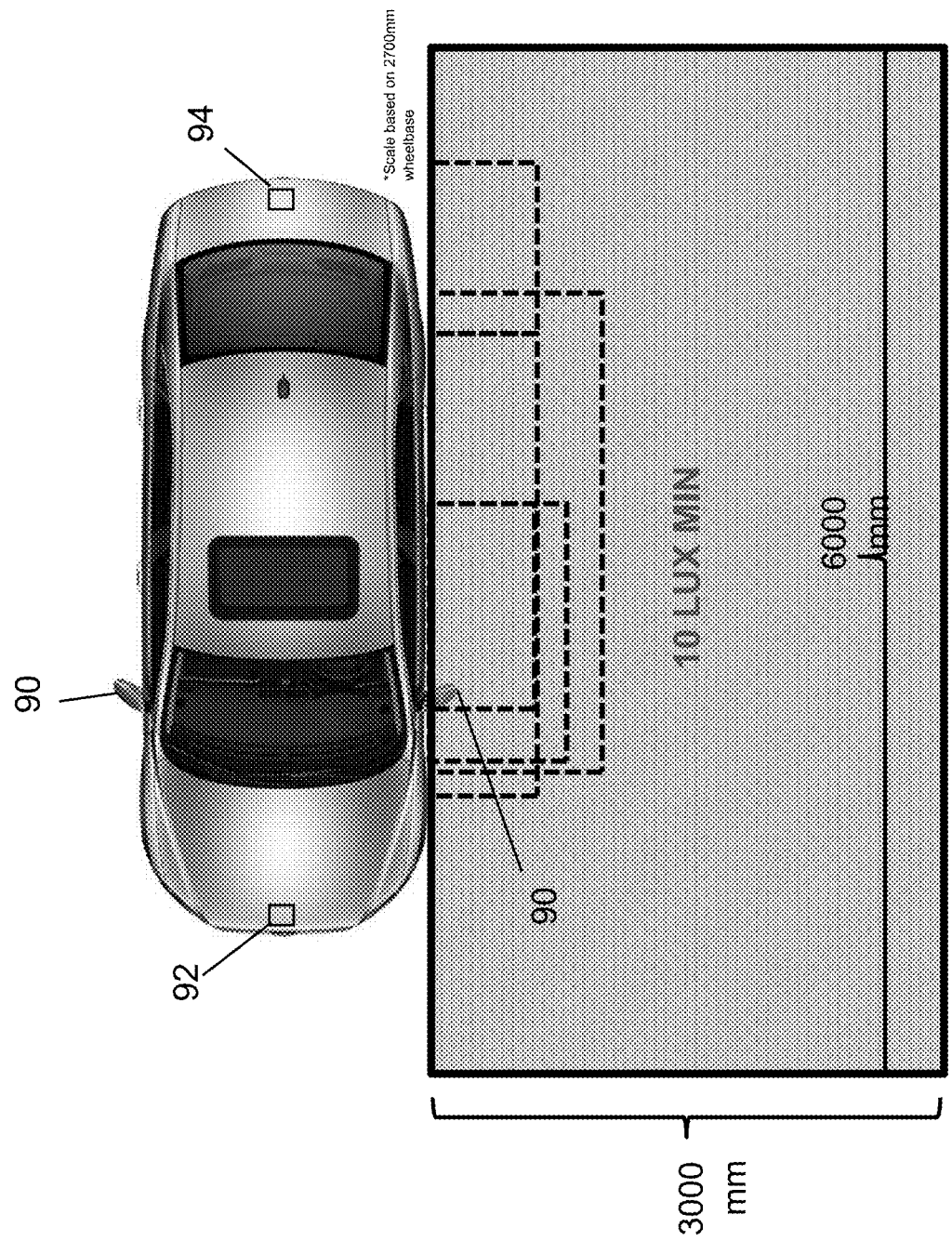
FIG. 13 is a plan view of a vehicle with a 360 degree ground illumination light module in accordance with the present invention.
Figure 13A:
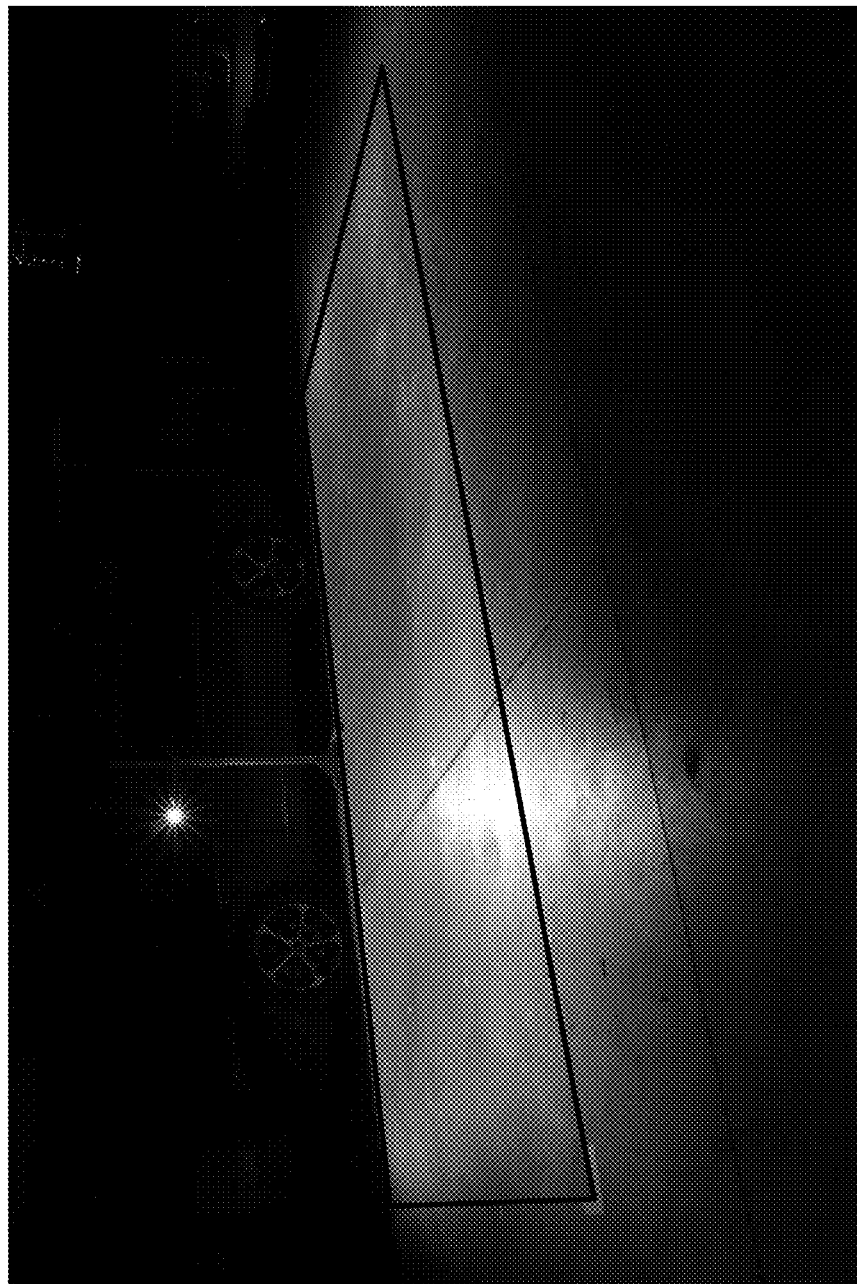
FIG. 13A is a perspective view showing the illuminated region at the ground by the vehicle with the 360 degree ground illumination light module.

As shown in FIGS. 9-12, the illumination provided by a standard ground illumination light (FIG. 9), a twin ground illumination light (FIG. 10), a high power ground illumination light (FIGS. 11 and 11A), and a super ground illumination light (FIGS. 12 and 12A), functions to illuminate a narrow region at and partially along the side of the vehicle. With reference to FIGS. 13 and 13A, the illumination module of the present invention provides a much larger illuminated region to provide enhanced image capturing by a side-viewing camera 90, a front-viewing camera 92 and a rear-viewing camera 94.

Figure 15:
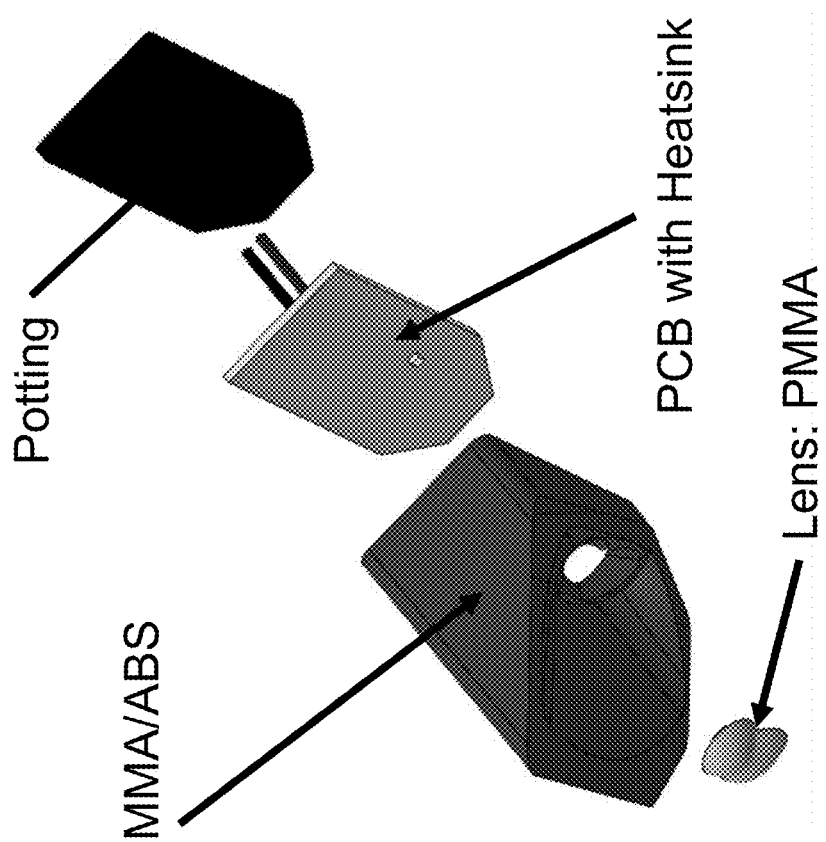
FIG. 15 is an exploded perspective view of the 360 degree ground illumination light module of FIG. 14.
Figure 14:
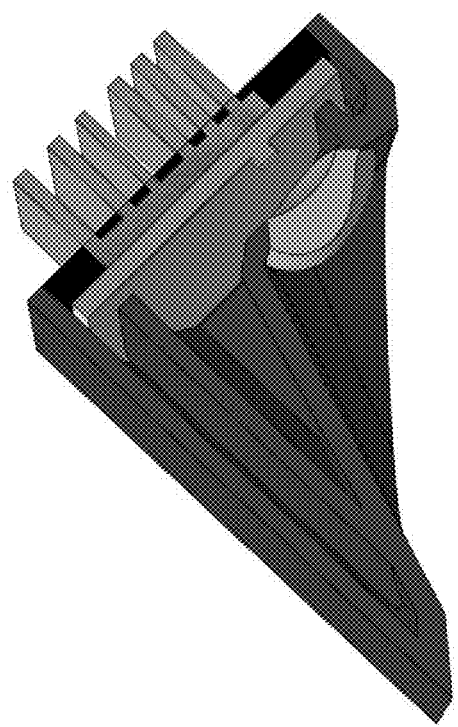
FIG. 14 is a sectional view of the 360 degree ground illumination light module.

In the illustrated embodiment, and such as shown in FIGS. 14 and 15, the illumination module 110 comprises a housing and a lens, with one or more LEDs disposed at a printed circuit board (with a heatsink), where the housing receives the PCB therein, such that electrical connecting terminals and heat sink fins protrude from the rear of the housing. A potting material is disposed at the rear of the housing to seal the PCB therein and to seal around the heatsink fins and the electrically conductive terminals. During assembly of the illumination module, the PCB is disposed at the housing with the heatsink fins and electrical connecting terminals protruding from the housing, and the potting material is dispensed (such as in a liquid or fluid or uncured state) at the rear of the housing to flow around the fins and terminals and to (when cured) seal the rear of the housing with the fins and terminals protruding from the cured potting material.

Figure 16:
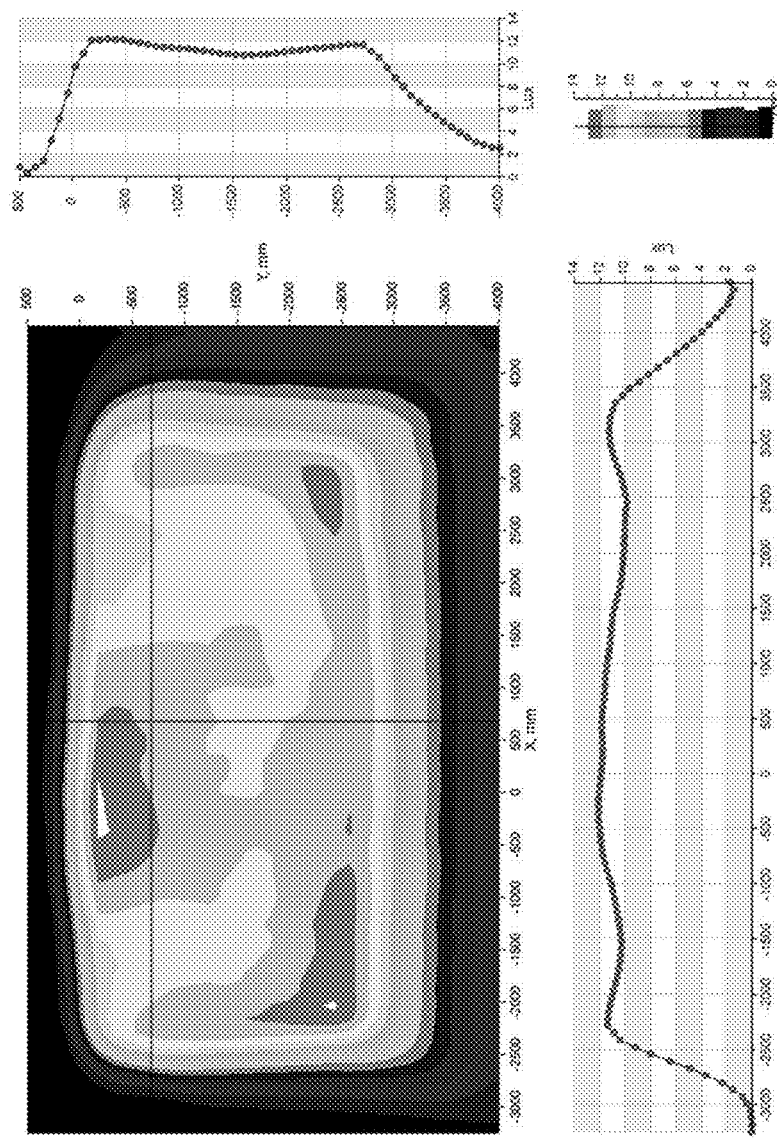
FIG. 16 is a graph showing output of the 360 degree ground illumination light module.
Figure 17:
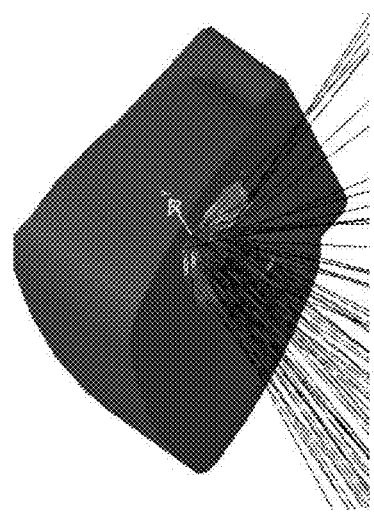
FIG. 17 is a perspective view of the 360 degree ground illumination light module.

The lens may comprise a tailored optic or freeform optic, such as a formed optic utilizing aspects of the optics or elements described in U.S. Pat. Nos. 8,917,437 and/or 8,801,245, and/or U.S. Publication No. US-2015-0224919, which are hereby incorporated herein by reference in their entireties. The housing may comprise a two-shot housing and the LED or LEDs may comprise a four Watt LED. As shown in FIGS. 16 and 17, the illumination provided or emitted by the light module provides a large area of illumination at the ground at the side of the vehicle and forward and rearward of the vehicle.

The illumination module thus may utilize freeform optics to provide a lens that is capable of spreading or directing substantially uniform illumination over a large area sideward and forward and rearward of the vehicle.

Other illumination modules or lighting devices may be disposed at the vehicle to provide various light functions. For example, a "car finder" spotlight may be operable to project a beam of light forward of the vehicle and/or rearward of the vehicle so as to project light into an aisle of a parking lot to assist the vehicle owner or user in finding the vehicle. The spotlight is operable responsive to a transmitted signal from a key fob or the like or responsive to detection of a passive device carried by the user. For such an application, it is envisioned that the lighting device or module may be disposed at a front and/or rear portion of the vehicle, or may be disposed at the interior rearview mirror assembly (where the light beam is directed through the windshield and/or rear window of the vehicle). Optionally, the spotlight may also or otherwise be projected upward. Optionally, such an upward projecting light may be used when the vehicle is parked inside (such as in a garage), whereby the light may reflect off the ceiling to provide diffuse lighting around the vehicle.

Optionally, an illumination device may be disposed at an A-pillar of the vehicle and/or at a leading edge of the exterior mirror sail. Such an illumination device may provide a lane departure warning indication and/or an object detection warning indication or the like.

Figure 18:
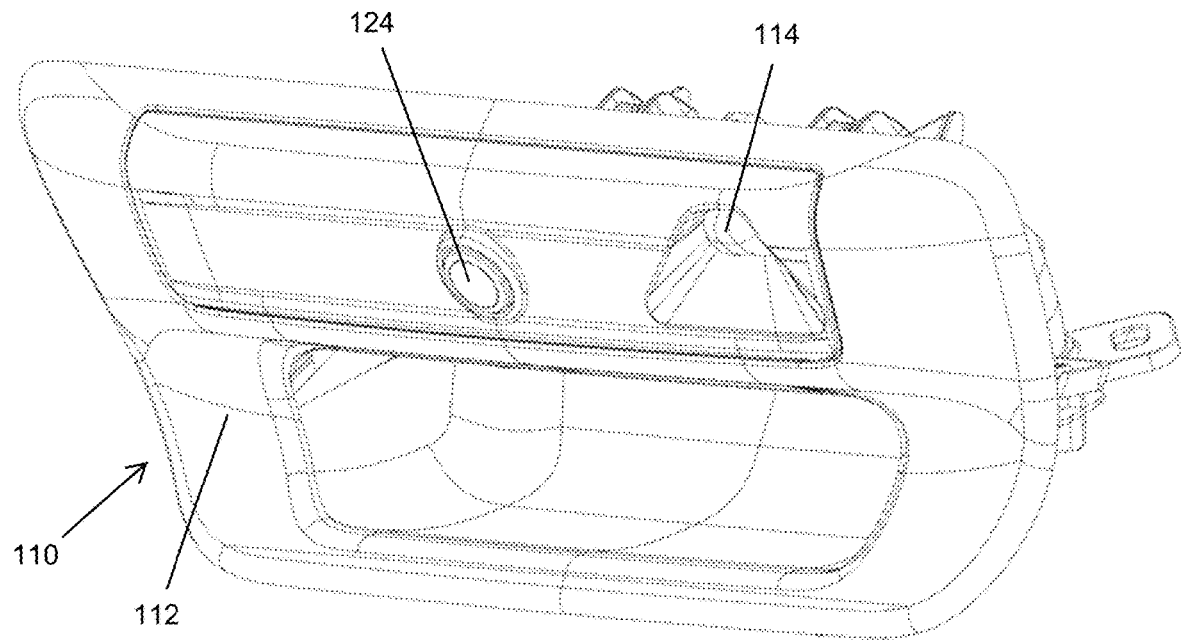
FIG. 18 is a perspective view of a tailgate handle module that includes a camera and illumination module.
Figure 19:
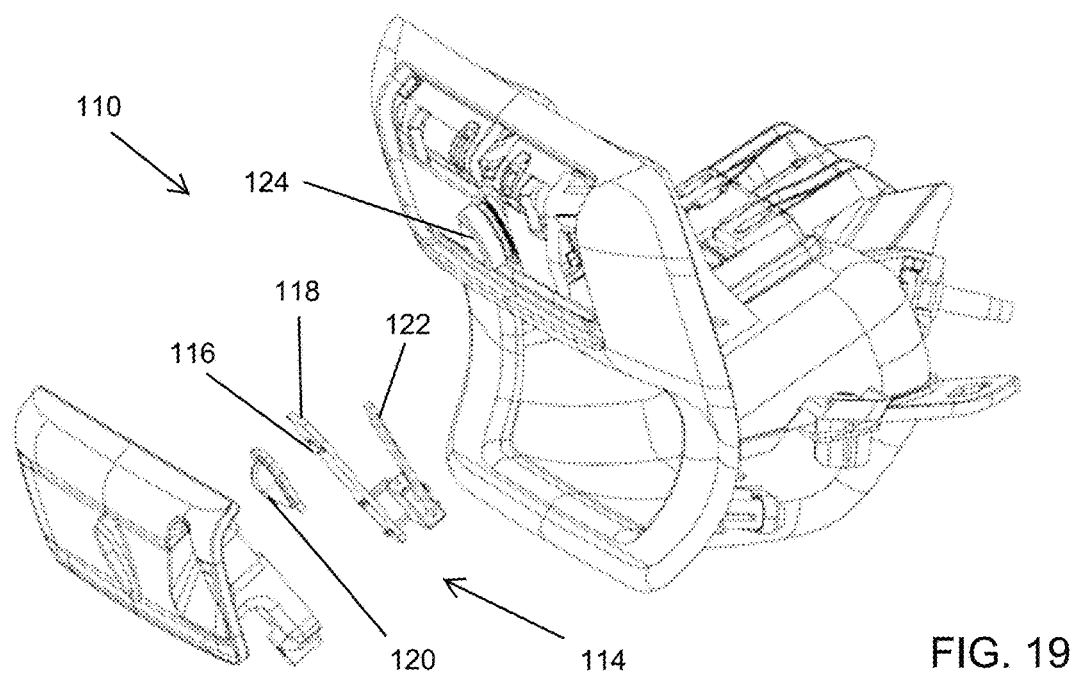
FIG. 19 is an exploded perspective view of the tailgate handle module of FIG. 18.

Optionally, an illumination module may be incorporated into a tailgate handle at a tailgate of a vehicle. For example, and with reference to FIGS. 18 and 19, a tailgate handle module or assembly 110 includes a housing 112 that houses or supports an illumination module 114. The illumination module comprises at least one light emitting diode 116 (such as a high power LED) disposed at a circuit element or printed circuit board 118. The illumination module 114 includes a freeform lens optic 120 that is formed to provide the desired or appropriate illumination pattern at the ground rearward of the vehicle equipped with the tailgate handle assembly. The lens optic and circuit element may be disposed at or supported at the housing and the circuit element may be sealed at the housing via a potting material, whereby electrically conductive terminals 122 of the circuit element extend from the housing and through the potting material to electrically connect at an electrical connector of the tailgate handle or of the vehicle. The illumination module may be disposed at an upper region of the tailgate handle assembly, and the tailgate handle assembly may include a cover element 111 that snap-attaches (or otherwise attaches) at the upper region of the tailgate handle assembly to encase the illumination module (and optionally a rear backup camera 124 as well) at the tailgate handle assembly.

The illumination module 114 provides uniform light distribution at the ground to the rear of the vehicle and spanning the entire width of the tailgate and vehicle. The illumination module may provide uniform light at the rear bumper of the vehicle and at a trailer hitch of the vehicle so as to illuminate the trailer hitch to enhance hitching a trailer to the vehicle in low ambient lighting conditions. The illumination module may also be utilized to illuminate at least a portion of a field of view of a rear backup camera 124 (such as a rear backup camera disposed at or incorporated in the tailgate handle module or assembly). In such an application, the illumination module may be activated or powered responsive to the vehicle being shifted into a reverse gear and optionally also only activated or powered when such shifting occurs at an ambient light level that is below a threshold illumination level (in other words, the activation of the illumination module may be responsive to both shifting into a reverse gear and an ambient light sensor).

The tailgate handle area provides a good vantage point for illuminating the hitch/bumper area. By using tailored or freeform optics, the light distribution can be very uniform at the area rearward of the vehicle. Optionally, additional LEDs/optics can be added to illuminate the ground region when the tailgate is opened or lowered.

Optionally, the LED may be powered with a switching power supply to eliminate the need of a heat sink at the illumination module. Such a power supply may also provide uniform brightness across the whole voltage range of 9-16 volts DC.

Optionally, an illumination module of this type may also be disposed at or incorporated at the front of the vehicle to illuminate the area around and forward of the front bumper as well. Additionally, a system of light modules for use with a bird's eye view camera systems may include freeform optics at each light module so as to illuminate the ground region around the entire perimeter of the vehicle with uniform light. The light modules in the outside mirrors or outside door handles would illuminate the sides of the vehicle, the light module mounted in the tailgate/liftgate would illuminate the rear of the vehicle, and the light module mounted in the front bumper, front emblem or grill of the vehicle would illuminate the front of the vehicle.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior lighting system comprising:
   a lighting module disposed at a side of a vehicle, the lighting module comprising at least one light emitting diode, the lighting module operable to emit light that is viewable by a person exterior the side of the vehicle who is viewing the side of the vehicle;
   wherein the lighting module emits white light responsive to a signal from a remote device to provide ground illumination of a ground region at the side of the vehicle at which the lighting module is disposed;
   wherein the lighting module (i) emits a first color of light responsive to a door lock signal and (ii) emits a second color of light responsive to a door unlock signal; and
   wherein the first color of light is different than the second color of light.

2. The vehicular exterior lighting system of claim 1, wherein the at least one light emitting diode comprises a plurality of light emitting diodes.

3. The vehicular exterior lighting system of claim 2, wherein the plurality of light emitting diodes comprises at least (i) a red light-emitting light emitting diode that emits red light responsive to the door lock signal, (ii) a green light-emitting light emitting diode that emits green light responsive to the door unlock signal, and (iii) a white light-emitting light emitting diode that emits white light responsive to the signal from the remote device.

4. The vehicular exterior lighting system of claim 1, wherein the first color is red and the second color is green.

5. The vehicular exterior lighting system of claim 1, wherein the lighting module episodically emits light in different patterns responsive to respective triggers.

6. The vehicular exterior lighting system of claim 1, wherein the lighting module is disposed at a door handle assembly at a door handle region of a vehicle door of the vehicle, the door handle assembly comprising a handle portion at the door handle region of the vehicle door.

7. The vehicular exterior lighting system of claim 6, wherein the handle portion is disposed at a pocket region of the door handle region, and wherein the lighting module is operable to emit light to illuminate the pocket region of the door handle region.

8. The vehicular exterior lighting system of claim 7, wherein the lighting module is disposed at an inner portion of the handle portion, and wherein a transparent or translucent cover element of the lighting module comprises an inner surface of the inner portion of the handle portion, and wherein light emitted by the lighting module illuminates the pocket region of the door handle region.

9. The vehicular exterior lighting system of claim 7, wherein the lighting module is disposed at the pocket region of the door handle region, and wherein light emitted by the lighting module directly illuminates an inner portion of the handle portion that faces the pocket region of the door handle region.

10. The vehicular exterior lighting system of claim 9, wherein the inner portion of the handle portion facing the pocket region of the door handle region is formed to reflect light emitted by the lighting module downward toward the ground region at the side of the vehicle.

11. The vehicular exterior lighting system of claim 10, wherein the inner portion of the handle portion comprises a reflective surface.

12. The vehicular exterior lighting system of claim 6, wherein the at least one light emitting diode of the lighting module is disposed at an end portion of the handle portion, and wherein light emitted by the at least one light emitting diode passes along the handle portion of the door handle assembly.

13. The vehicular exterior lighting system of claim 1, wherein the lighting module is disposed at an exterior rearview mirror assembly disposed at the side of the vehicle.

14. The vehicular exterior lighting system of claim 1, wherein the lighting module comprises a cover element, and wherein, light emitted by the at least one light emitting diode passes through the cover element.

15. The vehicular exterior lighting system of claim 14, wherein the cover element diffuses light passing therethrough.

16. A vehicular exterior lighting system comprising:
   a lighting module disposed at a side of a vehicle, the lighting module comprising a plurality of light emitting diodes, the lighting module operable to emit light that is viewable by a person exterior the side of the vehicle who is viewing the side of the vehicle;
   wherein the plurality of light emitting diodes comprises (i) a white light-emitting light emitting diode, (ii) a red light-emitting light emitting diode and (iii) a green light-emitting light emitting diode;
   wherein the white light-emitting light emitting diode emits white light responsive to a signal from a remote device to provide ground illumination of a ground region at the side of the vehicle at which the lighting module is disposed;
   wherein the red light-emitting light emitting diode emits red light responsive to a door lock signal; and
   wherein the white light-emitting light emitting diode emits white light and the green light-emitting light emitting diode emits green light responsive to a door unlock signal.

17. The vehicular exterior lighting system of claim 16, wherein the lighting module episodically emits light in different patterns responsive to respective triggers.

18. The vehicular exterior lighting system of claim 16, wherein the lighting module is disposed at a door handle assembly at a door handle region of a vehicle door of the vehicle, the door handle assembly comprising a handle portion at the door handle region of the vehicle door.

19. The vehicular exterior lighting system of claim 16, wherein the lighting module is disposed at an exterior rearview mirror assembly disposed at the side of the vehicle.

20. The vehicular exterior lighting system of claim 16, wherein the lighting module comprises a cover element, and wherein, light emitted by the plurality of light emitting diodes passes through the cover element, and wherein the cover element diffuses light passing therethrough.

21. The vehicular exterior lighting system of claim 16, wherein the lighting module is operable to flash red light.

22. The vehicular exterior lighting system of claim 16, wherein the lighting module emits amber light responsive to actuation of a turn signal indicator.

23. A vehicular exterior lighting system comprising:
   a lighting module disposed at a side of a vehicle, the lighting module comprising a plurality of light emitting diodes, the lighting module operable to emit light that is viewable by a person exterior the side of the vehicle who is viewing the side of the vehicle;
   wherein the lighting module comprises a cover element, and wherein, light emitted by the plurality of light emitting diodes passes through the cover element;
   wherein the lighting module emits white light responsive to a signal from a remote device to provide ground illumination of a ground region at the side of the vehicle at which the lighting module is disposed;

wherein the lighting module (i) emits a first color or pattern of light responsive to a door lock signal and (ii) emits a second color or pattern of light responsive to a door unlock signal;

wherein the first color of light is different than the second color of light; and wherein the lighting module episodically emits light in different patterns responsive to respective triggers.

24. The vehicular exterior lighting system of claim 23, wherein the plurality of light emitting diodes comprises at least (i) a red light-emitting light emitting diode that emits red light responsive to the door lock signal, (ii) a green light-emitting light emitting diode that emits green light responsive to the door unlock signal, and (iii) a white light-emitting light emitting diode that emits white light responsive to the signal from the remote device.

25. The vehicular exterior lighting system of claim 24, wherein the red light-emitting light emitting diode is operable to flash red light.

26. The vehicular exterior lighting system of claim 23, wherein the lighting module is disposed at a door handle assembly at a door handle region of a vehicle door of the vehicle, the door handle assembly comprising a handle portion at the door handle region of the vehicle door.

27. The vehicular exterior lighting system of claim 23, wherein the lighting module is disposed at an exterior rearview mirror assembly disposed at the side of the vehicle.

\* \* \* \* \*